United States Patent [19]

De Palma

[11] Patent Number: 5,176,264
[45] Date of Patent: Jan. 5, 1993

[54] CIRCULAR, STACKABLE, ROTATABLE DISPLAY CASE FOR FLOPPY DISKS/COMPACT DISKS AND THE LIKE

[76] Inventor: Michael J. De Palma, 2861 Dudley Ave., Bronx, N.Y. 10461-5611

[21] Appl. No.: 787,363

[22] Filed: Nov. 4, 1991

[51] Int. Cl.⁵ .............................................. A47G 29/00
[52] U.S. Cl. ........................................ 211/40; 211/41; 211/163; 40/379
[58] Field of Search ................ 211/40, 163, 188, 194, 211/41; 206/309, 387, 444; 40/537, 493, 379; 312/11

[56] References Cited

U.S. PATENT DOCUMENTS

| | | | |
|---|---|---|---|
| 3,221,890 | 12/1965 | Wassell | 211/184 X |
| 3,860,120 | 1/1975 | Victor | 211/184 X |
| 3,868,916 | 3/1975 | Ohlson | 211/163 X |
| 3,921,811 | 11/1975 | Dameron | 211/184 X |
| 4,534,471 | 8/1985 | Zahn et al. | 211/163 X |
| 4,802,587 | 2/1989 | Armijo et al. | 211/40 X |
| 5,020,043 | 5/1991 | Kohler | 312/11 X |
| 5,031,779 | 7/1991 | Szenay et al. | 211/40 |

Primary Examiner—Blair M. Johnson
Attorney, Agent, or Firm—Michael I. Kroll

[57] ABSTRACT

A circular, stackable, rotatable display case is provided for floppy disks/compact disks and the like which consists of a mechanism for radially storing a plurality of the floppy disks/compact disks and the like and another mechanism for rotating the radially storing mechanism, so that any one of the floppy disks/compact disks and the like can be selectively removed from the radially storing mechanism.

8 Claims, 2 Drawing Sheets

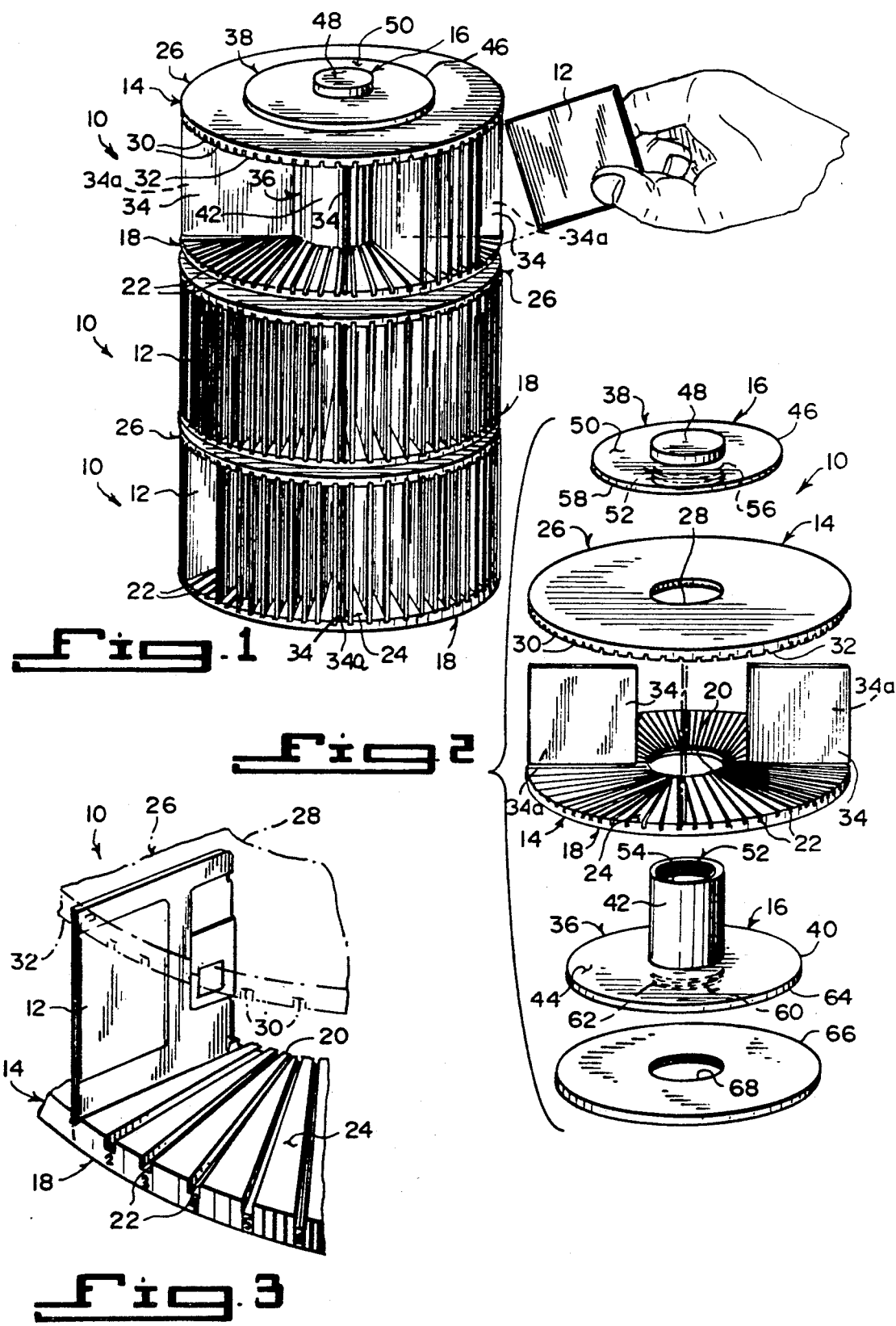

CIRCULAR, STACKABLE, ROTATABLE DISPLAY CASE FOR FLOPPY DISKS/COMPACT DISKS AND THE LIKE

BACKGROUND OF THE INVENTION

1. Field of the Invention

The instant invention relates generally to storage cases and more specifically it relates to a circular, stackable, rotatable display case for floppy disks/compact disks and the like.

2. Description of the Prior Art

Numerous storage cases have been provided in prior art that are adapted to hold various items therein when the items are not being used. While these units may be suitable for the particular purpose to which they address, they would not be as suitable for the purposes of the present invention as heretofore described.

SUMMARY OF THE INVENTION

A first object of the present invention is to provide a circular, stackable, rotatable display case for floppy disks/compact disks and the like that will overcome the shortcomings of the prior art devices.

A second object is to provide a circular, stackable, rotatable display case for floppy disks/compact disks and the like that will hold a large plurality of disks, so that the disks are readily available for use.

An third object is to provide a circular, stackable rotatable display case for floppy disks/compact disks and the like that can be manufactured such that the disks slant downwardly toward the center, so that the disks will not slip out while the display case holding the disks is being transported.

A fourth object is to provide a circular, stackable, rotatable display case for floppy disks/compact disks and the like that because the case is circular, it will take up less space than say a square case whose sides are equal to the diameter of the circular case.

A fifth object is to provide a circular, stackable, rotatable display case for floppy disks/compact disks and the like that is simple and easy to use.

A sixth object is to provide a circular, stackable, rotatable display case for floppy disks/compact disks and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention in a stacked relationship.

FIG. 2 is an exploded perspective view of the components of the instant invention.

FIG. 3 is an enlarged perspective view of a portion of the instant invention showing a disk between the bottom and top platter members.

DETAILED DESCRIPTION OF THE PREFERRED EMBODIMENTS

Figure 4:
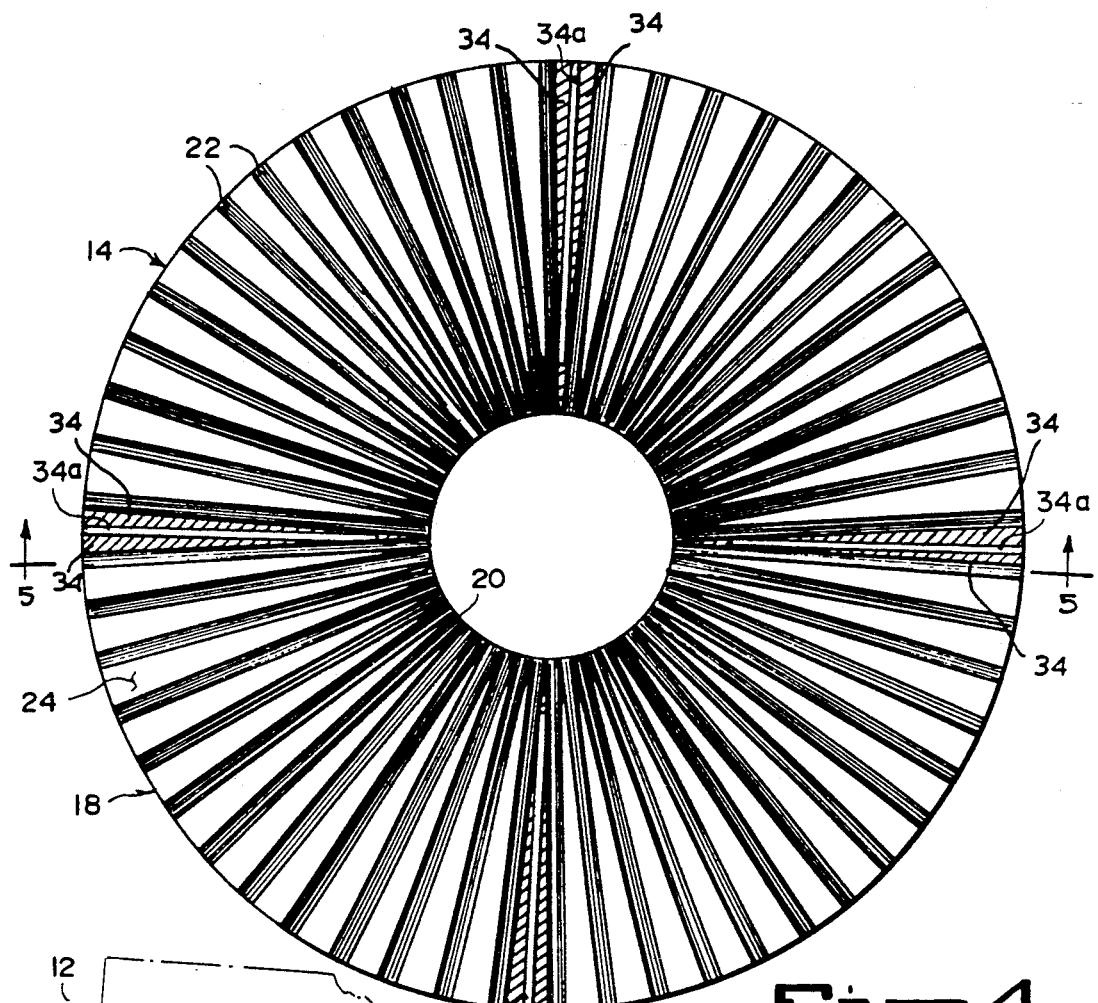
FIG. 4 is a top view of the bottom platter member showing the divider members thereon, including the slots for storage of cards, upon which disk names and other information can be written.

Turning now descriptively to the drawings, in which similar reference characters denote similar elements throughout the several views, the Figures illustrate a circular, stackable, rotatable display case 10 for floppy disks/compact disks and the like 12, which consists of a mechanism 14 for radially storing a plurality of the floppy disks/compact disks and the like 12 and another mechanism 16 for rotating the radially storing mechanism 14, so that any one of the floppy disks/compact disks and the like 12 can be selectively removed from the radially storing mechanism 14.

The radially storing mechanism 14 includes a bottom circular platter member 18 having a central aperture 20 and a plurality of spaced apart radial slots 22 on the top surface 24 of the bottom circular platter member 18. A top circular platter member 26 has a central aperture 28 and a plurality of spaced apart radial slots 30 on the bottom surface 32 of the top circular platter member 26.

A plurality of divider members 34, are spaced apart and vertically extend between the top surface 24 of the bottom circular platter member 18 and the bottom surface 32 of the top circular platter member 26. The divider members 34 are of a height to allow the floppy disks/compact disks and the like to be inserted and removed from the aligned radial slots 22 and 30 between the bottom circular platter member 18 and the top circular platter member 26. Each divider member 34 also has a slot 34a extending therein for storage of a card upon which disk names and other information can be written.

Figure 5:
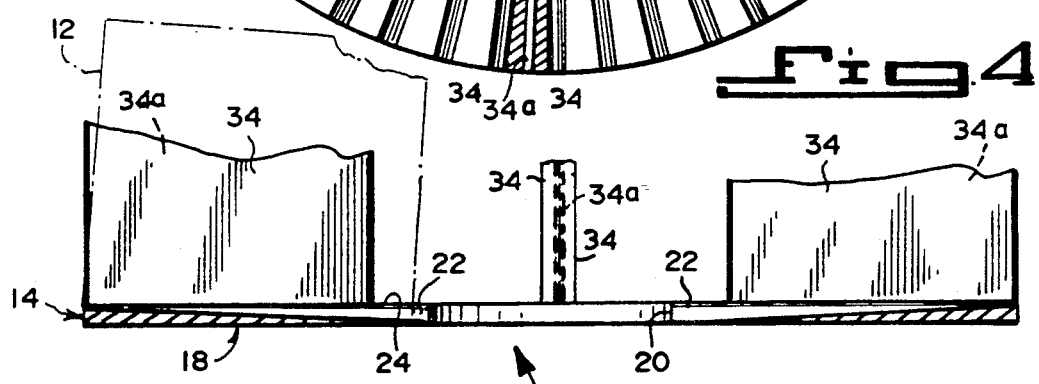
FIG. 5 is a cross sectional view taken along line 5—5 in FIG. 4.

As shown in FIG. 5, each radial slot 22 in the bottom circular member 18 is slanted downwardly towards the central aperture 20, so that the floppy disks/compact disks and the like 12 will not slip out when the display case 10 is being transported.

The rotating mechanism 16 includes a spindle member 36 insertable up through the central aperture 20 in the bottom circular platter member 18. A cap member 38 is insertable down through the central aperture 28 in the top circular platter member 26 to engage with the spindle member 36, so that the radially storing mechanism 14 can rotate thereabout.

The spindle member 36 includes a circular lower flange 40 and an upright barrel 42 centrally located on a top surface 44 of the circular lower flange 40 and is sized to fit up through the central aperture 20 in the bottom circular platter member 18.

The cap member 38 includes a circular upper flange 46, a head portion 48 centrally located on a top surface 50 of the circular upper flange 46 and a mechanism 52 for removably engaging with the top end of the upright barrel 42 of the spindle member 36.

The cap member removably engaging mechanism 52 includes the upright barrel 42 having an internally threaded bore 54 extending inwardly form the top end and an externally threaded boss 56 centrally located on a bottom surface 58 of the circular upper flange 46 of the cap member 38. The externally threaded boss 56 can threadably engage with the internally threaded bore 54 in the upright barrel 42.

The spindle member 36 includes a mechanism 60 for removably engaging with the top end of the upright barrel 42 of another spindle member 36, thereby making the spindle members 36 stackable, as shown in FIG. 1. The spindle member removably engaging mechanism 60 includes an externally threaded boss 62 centrally located on a bottom surface 64 of the circular lower flange 40 of the spindle member 36. The externally threaded boss 62 can threadably engage with the internally threaded bore 54, in the upright barrel 42 of another spindle member 36.

The circular, stackable, rotatable display case 10 for floppy disks/compact disks and the like 12, as shown in FIG. 2, further includes a circular base member 66 having a central threaded aperture 68. The externally threaded boss 62 on the bottom surface 64 of the circular lower flange 40 of the spindle member 36 can threadably engage with the central threaded aperture 68 in the circular base member 66 for stabilizing the spindle member 36 on a flat horizontal surface.

Figure 6:
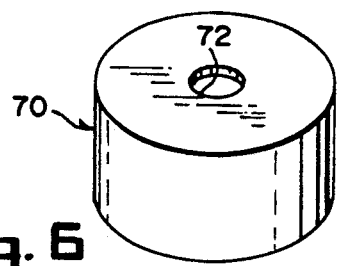
FIG. 6 is a perspective view of a cover for the instant invention.

As shown in FIG. 6, the circular, stackable, rotatable display case 10 for floppy disks/compact disks and the like 12 further includes a cover 70 for protecting the display case 10 when being transported. The cover 70 has a top central aperture 72, so that the cover 70 can fit completely over the radially storing mechanism 14 and still allow the externally threaded boss 56 of the cap member 38 and the externally threaded boss 62 of the spindle member 36 to pass through the top central aperture 72.

The radially storing mechanism 14, the rotating mechanism 16, the circular base member 66 and the cover 70 are all fabricated out of a durable, strong material, so that the display case 10 will function and last over a long period of time. The material can be various types of metal, plastic, wood and the like.

As best seen in FIG. 3, the bottom circular platter member 18 can also include a number printed on its circumference at each radial slot 22. These numbers can be indexed on the cards in the slots 34a in the divider members 34 for finding the desired disk 12 more easily and quickly.

LIST OF REFERENCE NUMBERS 10 circular, stackable, rotatable display case
12 floppy disk/compact disk and the like
14 radially storing mechanism of 10
16 rotating mechanism of 10
18 bottom circular platter member of 14
20 central aperture in 18
22 radial slot in 18
24 top surface of 18
26 top circular platter member of 14
28 central aperture in 26
30 radial slot in 26
32 bottom surface of 26
34 divider member of 14
34a slot in 34
36 spindle member of 16
38 cap member of 16
40 circular lower flange of 36
42 upright barrel of 36
44 top surface of 40
46 circular upper flange of 38
48 head portion of 38
50 top surface of 46
52 cap member removably engaging mechanism on 36, 38
54 internally threaded bore in 42
56 externally threaded boss on 46
58 bottom surface of 46
60 spindle member removably engaging mechanism on 36
62 externally threaded boss on 40
64 bottom surface of 40
66 circular base member
68 central threaded aperture in 66
70 cover
72 top central aperture It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A circular, stackable, rotatable display case for floppy disks/compact disks and the like which comprises:
   a) a bottom circular platter member having a central aperture and a plurality of spaced apart radial slots on the top surface of said bottom circular platter member;
   b) a top circular platter member having a central aperture and a plurality of spaced apart radial slots on the bottom surface of said top circular platter member;
   c) a plurality of divider members, spaced apart and vertically extending between the top surface of said bottom circular platter member and the bottom surface of said top circular platter member, whereby said divider members are of a height to allow the floppy disks/compact disks and the like to be inserted and removed from the aligned radial slots between said bottom circular platter member and said top circular platter member, with each said divider member also having a lost extending therein for storage of a card upon which disk names and other information can be written; and
   d) means for rotating said radially storing means, so that any one of the floppy disks/compact disks and the like can be selectively removed from said radially storing means.

2. A circular, stackable, rotatable display case for floppy disks/compact disks and the like as recited in claim 1, wherein each said radial slot in said bottom circular member is slanted downwardly towards the central aperture, so that the floppy disks/compact disks and the like will not slip out when said display case is being transported.

3. A circular, stackable, rotatable display case for floppy disks/compact disks and the like as recited in claim 2, wherein said rotating means includes:
a) a spindle member insertable up through the central aperture in said bottom circular platter member; and
b) a cap member insertable down through the central aperture in said top circular platter member to engage with said spindle member, so that said radially storing means can rotate thereabout.

4. A circular, stackable, rotatable display case for floppy disks/compact disks and the like as recited in claim 3, wherein said spindle member includes:
a) a circular lower flange; and
b) an upright barrel centrally located on a top surface of said circular lower flange and sized to fit up through the central aperture in said bottom circular platter member.

5. A circular, stackable, rotatable display case for floppy disks/compact disks and the like as recited in claim 4, wherein said cap member includes:
a) a circular upper flange;
b) a head portion centrally located on a top surface of said circular upper flange; and
c) means for removably engaging with the top end of said upright barrel of said spindle member.

6. A circular, stackable, rotatable display case for floppy disks/compact disks and the like as recited in claim 5, wherein said cap member removably engaging means includes:
a) said upright barrel having an internally threaded bore extending inwardly from the top end; and
b) an externally threaded boss centrally located on a bottom surface of said circular upper flange of said cap member, so that said externally threaded boss can threadably engage with the internally threaded bore in said upright barrel.

7. A circular, stackable, rotatable display case for floppy disks/compact disks and the like as recited in claim 6, wherein said spindle member includes means for removably engaging with the top end of said upright barrel of another said spindle member, thereby making said spindle members stackable.

8. A circular, stackable, rotatable display case for floppy disks/compact disks and the like as recited in claim 7, wherein said spindle member removably engaging means includes an externally threaded boss centrally located on a bottom surface of said circular lower flange of said spindle member, so that said externally threaded boss can threadably engage with the internally threaded bore in said upright barrel of another said spindle member.

* * * * *